(12) United States Patent
Gaertner et al.

(10) Patent No.: US 9,658,964 B2
(45) Date of Patent: May 23, 2017

(54) TIERED DATA STORAGE SYSTEM

(71) Applicant: Seagate Technology LLC, Cupertino, CA (US)

(72) Inventors: Mark Allen Gaertner, Vadnais Heights, MN (US); Mehmet Fatih Erden, St. Louis Park, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/558,396

(22) Filed: Dec. 2, 2014

(65) Prior Publication Data
US 2016/0154738 A1    Jun. 2, 2016

(51) Int. Cl.
*G06F 12/00* (2006.01)
*G06F 13/00* (2006.01)
(Continued)

(52) U.S. Cl.
CPC .......... *G06F 12/0871* (2013.01); *G06F 3/064* (2013.01); *G06F 3/0605* (2013.01);
(Continued)

(58) Field of Classification Search
CPC ........ G06F 3/06; G06F 3/0601; G06F 3/0602; G06F 3/0604; G06F 3/0608; G06F 3/061; G06F 3/0611; G06F 3/0613; G06F 3/0628; G06F 3/0629; G06F 3/0631; G06F 3/0632; G06F 3/0634; G06F 3/0638; G06F 3/064; G06F 3/0643; G06F 3/0644; G06F 3/0646; G06F 3/0647; G06F 3/0668; G06F 3/0671; G06F 3/0673; G06F 3/0674; G06F 3/0676; G06F 3/0677; G06F 3/068; G06F 3/0683; G06F 3/0685; G06F 3/0689; G06F 12/08; G06F 12/0802; G06F 12/0866;
(Continued)

(56) References Cited

U.S. PATENT DOCUMENTS

| | | | | | |
|---|---|---|---|---|---|
| 4,577,240 | A | * | 3/1986 | Hedberg | G11B 5/5521 360/22 |
| 4,972,396 | A | * | 11/1990 | Rafner | G11B 5/4886 360/18 |

(Continued)

OTHER PUBLICATIONS

What is Hard Disk? Explain how Data are stored and organized on a Hard Disk; ekapad; Jul. 11, 2012; retrieved from http://www.docsity.com/en/answers/fundamentals-of-information-technology/what-hard-disk-explain-how-data-are-stored-organized-hard-disk/12576/ on Feb. 9, 2016 (1 page).*

(Continued)

*Primary Examiner* — Daniel C Chappell
(74) *Attorney, Agent, or Firm* — Holzer Patel Drennan

(57) ABSTRACT

A storage media comprising a first storage subset with a first value of a storage media characteristic and a second storage subset with a second value of the storage media characteristic, the first value of a storage media characteristic being substantially different than the second value of the storage media characteristic and a storage controller configured to allocate a plurality of logical block addresses (LBAs) between the first storage subset and the second storage subset based on a predetermined criterion in view of the first value of the storage media characteristic and the second value of the storage media characteristic.

17 Claims, 6 Drawing Sheets

(51) Int. Cl.
*G06F 13/28* (2006.01)
*G06F 12/0871* (2016.01)
*G06F 3/06* (2006.01)
*G11B 27/00* (2006.01)

(52) U.S. Cl.
CPC ............ *G06F 3/0676* (2013.01); *G11B 27/00* (2013.01); *G06F 2212/211* (2013.01); *G06F 2212/224* (2013.01); *G06F 2212/7201* (2013.01)

(58) Field of Classification Search
CPC ............. G06F 12/0868; G06F 12/0871; G06F 12/0873; G06F 2003/0691; G06F 2003/0695; G06F 2212/10; G06F 2212/1016; G06F 2212/1021; G06F 2212/1024; G06F 2212/1041; G06F 2212/1044; G06F 2212/21; G06F 2212/211; G06F 2212/217; G06F 2212/2112; G06F 2212/224
USPC ......................................................... 711/113
See application file for complete search history.

(56) References Cited

U.S. PATENT DOCUMENTS

| | | | | |
|---|---|---|---|---|
| 6,115,788 | A * | 9/2000 | Thowe | G06F 3/0613 711/111 |
| 7,076,603 | B1 * | 7/2006 | Chheda | G11B 20/1217 360/72.1 |
| 7,982,994 | B1 * | 7/2011 | Erden | G11B 5/02 360/55 |
| 8,599,510 | B1 * | 12/2013 | Fallone | G11B 5/02 360/31 |
| 8,824,106 | B1 * | 9/2014 | Garfunkel | G11B 5/2654 360/316 |
| 8,873,178 | B2 * | 10/2014 | Erden | G11B 20/1217 360/39 |
| 8,902,527 | B1 * | 12/2014 | Coker | G11B 5/5521 360/48 |
| 9,036,284 | B1 * | 5/2015 | Feldman | G11B 20/1217 360/31 |
| 2004/0136104 | A1 * | 7/2004 | Chiao | G11B 5/012 360/31 |
| 2008/0005475 | A1 * | 1/2008 | Lubbers | G06F 3/0613 711/118 |
| 2009/0002863 | A1 * | 1/2009 | Feldman | G11B 5/09 360/48 |
| 2010/0208384 | A1 * | 8/2010 | Tran | G11B 5/5521 360/75 |
| 2010/0274827 | A1 * | 10/2010 | Hix | G06F 17/30289 707/813 |
| 2011/0167230 | A1 * | 7/2011 | Quan | G06F 3/061 711/154 |
| 2012/0151134 | A1 * | 6/2012 | Friendshuh | G06F 12/0868 711/113 |
| 2013/0198449 | A1 * | 8/2013 | Belluomini | G06F 3/0604 711/114 |
| 2013/0286502 | A1 | 10/2013 | Erden et al. | |
| 2014/0043708 | A1 | 2/2014 | Erden et al. | |
| 2014/0233134 | A1 | 8/2014 | Erden et al. | |
| 2014/0289458 | A1 * | 9/2014 | Lassa | G06F 3/0619 711/103 |
| 2015/0269964 | A1 * | 9/2015 | Fallone | G11B 20/1217 360/49 |
| 2016/0012849 | A1 * | 1/2016 | Feldman | G06F 3/0608 360/48 |
| 2016/0012850 | A1 * | 1/2016 | Feldman | G11B 20/1217 360/48 |

OTHER PUBLICATIONS

Are partitions to the inner/outer edge significantly faster; superuser sawdust; Sep. 11, 2013; retrieved from http://superuser.com/questions/643013/are-partitions-to-the-inner-outer-edge-significantly-faster on Feb. 8, 2016 (3 pages).*

Shingled Magnetic Recording and Two-Dimensional Magnetic Recording; Roger Wood; IEEE Magnetics Society Santa Clara Valley Chapter; Oct. 19, 2010; retrieved from http://www.ewh.ieee.org/r6/scv/mag/MtgSum/Meeting2010_10_Presentation.pdf on Feb. 8, 2016 (59 pages).*

A System Level Study of Two-Dimensional Magnetic Recording (TDMR); Chan et al; IEEE Transactions on Magnetics, vol. 49, iss. 6; Jun. 2013; pp. 2812-2817 (6 pages).*

Advanced channel signal processing for multi-track or multi-wordline data storage systems; Hwang, Euisok; 2015 International Conference on Information and Communication Technology Convergence; Oct. 28-30, 2015; pp. 319-323 (5 pages).*

* cited by examiner

TIERED DATA STORAGE SYSTEM

SUMMARY

According to one implementation, a storage media comprising a first storage subset with a first value of a storage media characteristic and a second storage subset with a second value of the storage media characteristic, the first value of a storage media characteristic being substantially different than the second value of the storage media characteristic and a storage controller configured to allocate a plurality of logical block addresses (LBAs) between the first storage subset and the second storage subset based on a predetermined criterion in view of the first value of the storage media characteristic and the second value of the storage media characteristic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Storage devices, such as disc drives are generally designed and manufactured to provide consistent data availability within pragmatic limits. For example, access time for all surfaces may be within about fifteen percentage of the access time from each other. While the data stored on disc drive is homogeneous, such consistent access time may be good. However, if data sets are different, which is generally the case, such uniform access times will result in data that is more important to be stored on a surface having the same access time as the data that is less important.

Similarly, various storage subsets on the storage media have a number of varying characteristics. For example, some storage subsets may store data with higher density while other storage subsets may store data with lower density. Another storage media characteristic that varies across various storage subsets may be the power expended by the storage device in reading or writing data from a various storage subsets such that the power expended in reading data from one storage subset may be higher than the power required in reading data from another storage subset. An example of another characteristic that has different value for different storage subsets is read access time, where one storage subset has a better read access time compared to other storage subsets. Alternatively, the write access time for various storage subsets may be different as well.

For example, a storage device may be configured where a first storage subset uses multi-level recording technology with a single reader while a second storage subset uses multi-track recording with multiple readers. In such a storage device it is useful that data stored in the first storage subset is more suitable for multi-level recording technology with a single reader and the data that is stored in the second storage subset is suitable for multi-track recording with multiple readers. Alternatively, a storage device may be configured where a first storage subset uses multi-level recording technology with a single reader; a second storage subset uses conventional binary signal level recording with a single reader; and a third storage subset uses multi-track recording with a multiple readers. In such a storage device first storage subset can be used for performance and power conscious data, second storage subset can be used for capacity and power conscious data, and thirst storage subset can be used for capacity and performance conscious data.

An implementation of storage device disclosed herein provides for using one or more criteria that is related to such storage media characteristics in determining which data is stored on a given storage subsection of the storage device.

Figure 1:
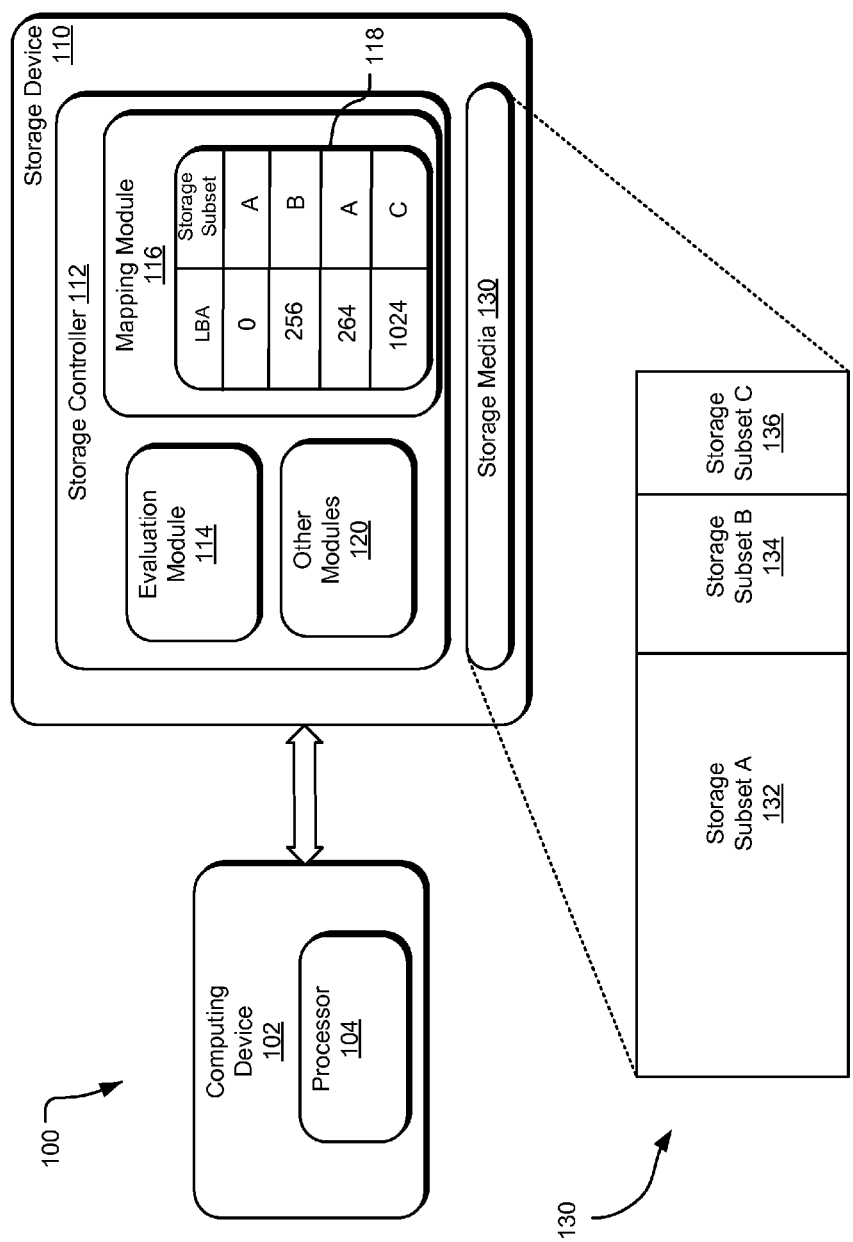
FIG. 1 illustrates an example block diagram of a computing system including a tiered data storage system disclosed herein.

FIG. 1 illustrates an example block diagram of a computing system 100 including a tiered data storage system disclosed herein. The computing system 100 includes a computing device 102 including a processor and communicatively connected to a storage device 110. While the storage device 110 is illustrated to be outside the computing device 102, in certain configurations the storage device 102 may be internal to the computing device 110. For example, the computing device 102 may be a laptop computer and the storage device 110 may be a hard disc drive (HDD). In alternative implementations, the storage device 110 may be one of a magnetic disc drive, an optical disc drive, a solid state drive (SSD) using flash memory, a SSD using different types of analog memory cells, such as, NAND, NOR, MRAM, ferroelectric RAM, magnetic RAM, spin-torque transfer RAM, resistive RAM, phase change memory, etc.

The computing device 102 may, directly or via the processor 104, send one or more commands to the storage device 110 to read data from the storage device 110, to write data from the storage device 110, to update data on the storage device 110, etc. An implementation of the storage device 110 includes a storage controller 112 and storage media 130. While the storage controller 112 may also include a number of other modules 120 such as a read channel module, a write channel module, a servo control module, etc., such components are further described below in FIG. 6.

The storage controller 112 is shown to include at least an evaluation module 114, a mapping module 116, and other modules 120. The storage controller 112 communicates with the computing device 102. For example, the storage controller 112 may receive a write command from the storage device, where the write command includes write data. Depending on the storage protocol used by the computing system 100, the write command received form the computing device 102 may or may not specify the location of storage for the write data. For example, in one implementation, the computing device 102 may specify merely a logical block address (LBA) where the write data is to be stored. In such an implementation, a file system resident on the computing device may keep mapping of the write data to the LBAs.

The storage controller 112 is configured to map the LBAs to specific physical location on the storage media 130 where the write data is stored. Such mapping of the LBAs to the physical storage locations may be managed by a mapping module 116. In the implementation illustrated herein, the storage media 130 is logically divided into a number of storage subsets. The illustrated implementation has the storage media 130 subdivided into a storage subset A 132, a storage subset B 134, and a storage subset C 136. Specifically, the storage media 130 may be divided into the storage subsets 132, 134, and 136 based on one or more characteristics of the storage media 130. Thus, for example, the storage subset A 132 may be a storage area where data is stored with multi-level recording such that it can be read using a single reader. On the other hand, the storage subset C 136 may be configured to store data using multi-track recording technology such that it can be read by multiple readers. Furthermore, the storage subset B 134 may be configured to store and/or read data using a combination of multi-level and multi-track recording with multiple readers having multiple levels under each reader.

In yet alternative implementation, the storage subset A 132 may be configured to provide more reliable storage compared to other storage subsets. In such an implementation, the storage controller 112 may be configured to us the storage subset A 132 as a disc-based media cache, media scratch pad, etc. Furthermore, if the storage subset A 132 only provides limited storage and is in high demand for storing a particular type of data, the storage controller 112 may be further configured to report availability of space on the storage subset A 132 to an external device such as a host device. In such a case, such external device may make one or more decision about utilizing the storage subset A 132 and/or the storage device 110 based on the information about the availability.

Another example where different storage subsets have different characteristics is an implementation of the storage device 110 where the storage subset A 132 is more optimized for writing than the storage subset B 134. For example, the storage subset A 132 may be configured as shingled media recording (SMR) storage subset that is more optimized for recording blocks of data at higher areal densities, whereas the storage subset B 134 may be configured as multi-track two-dimensional magnetic recording, which may be more optimized for bulk storage of data. In such an implementation, the storage controller 112 determines allocation of data between the storage subset A 132 and the storage subset B 134 based on combination of such optimization characteristics of the storage subsets and data characteristics.

Yet alternatively, one of the storage subsets 132, 134 may be using parallel readers and/or writers on multiple heads acting concurrently. In such an implementation, a storage subset using parallel readers and/or writers on multiple heads may be using multiple servo controls and multiple channels. As a result, the storage subset using parallel readers and writers on multiple heads provides reduced latency by reducing required head movements. In such an implementation, the storage controller 112 determines allocation of data between the storage subsets 132, 134 based on data characteristic that identifies the data as more suitable for reduced latency storage subset compared to other data.

Note that in the illustrated implementation, each of the storage subsets 132, 134, and 136 have different storage characteristics related to the recording technology, in an alternative implementation, the storage media 130 is divided into the storage subsets 132, 134, and 136 based on another characteristic, such as the storage density of the storage subsets 132, 134, and 136, the storage reliability of the storage subsets 132, 134, and 136, power usage per unit storage for each of the storage subsets 132, 134, and 136, the total cost of ownership (TCO) for each of the storage subsets 132, 134, and 136, etc. TCO of a storage subset may include composite cost that includes acquisition cost of the storage subset, operating cost (such as power, etc.), failure rate of the storage subset, etc.

An evaluation module 114 evaluates the write command received from the computing device 102 and the write data to determine how to map the write data to specific storage subsets on the storage media 130. For example, the evaluation module 114 may evaluate the frequency at which write data directed to the LBA address 256 is accessed and based on the access frequency it may determine that the write data should be stored in storage subset B 134. On the other hand, the evaluation module 114 may determine that the write data directed to the LBA address 264 should be stored in storage subset A 132. The mapping of the LBA addresses to the storage subsets 132, 134, 136, may be stored in by the mapping module 116 in a mapping table 118.

The evaluation module 114 may use a combination of characteristics of the write data and/or the data to be read and a combination of characteristics of various storage subsets 132, 134, 136 to determine the mapping between the LBAs and the storage subsets 132, 134, 136. For example, the evaluation module 114 may use the data rate of the various storage subsets 132, 134, 136 to determine where to map the write data based on the frequency at which the write data is accessed. Thus, write data that is accessed more frequently may be stored in a storage subset 134 and the write data that is accessed less frequently may be stored in the storage subset 132. Alternatively, the evaluation module 114 may use the data access rate of the storage subsets 132, 134, 136, together with the heat of the write data, where the heat of the data may be a combination of write heat specifying the frequency at which the write data is written to the storage media 130 and read heat specifying the frequency of the write data at which the write data is read from the storage media 130.

Figure 2:
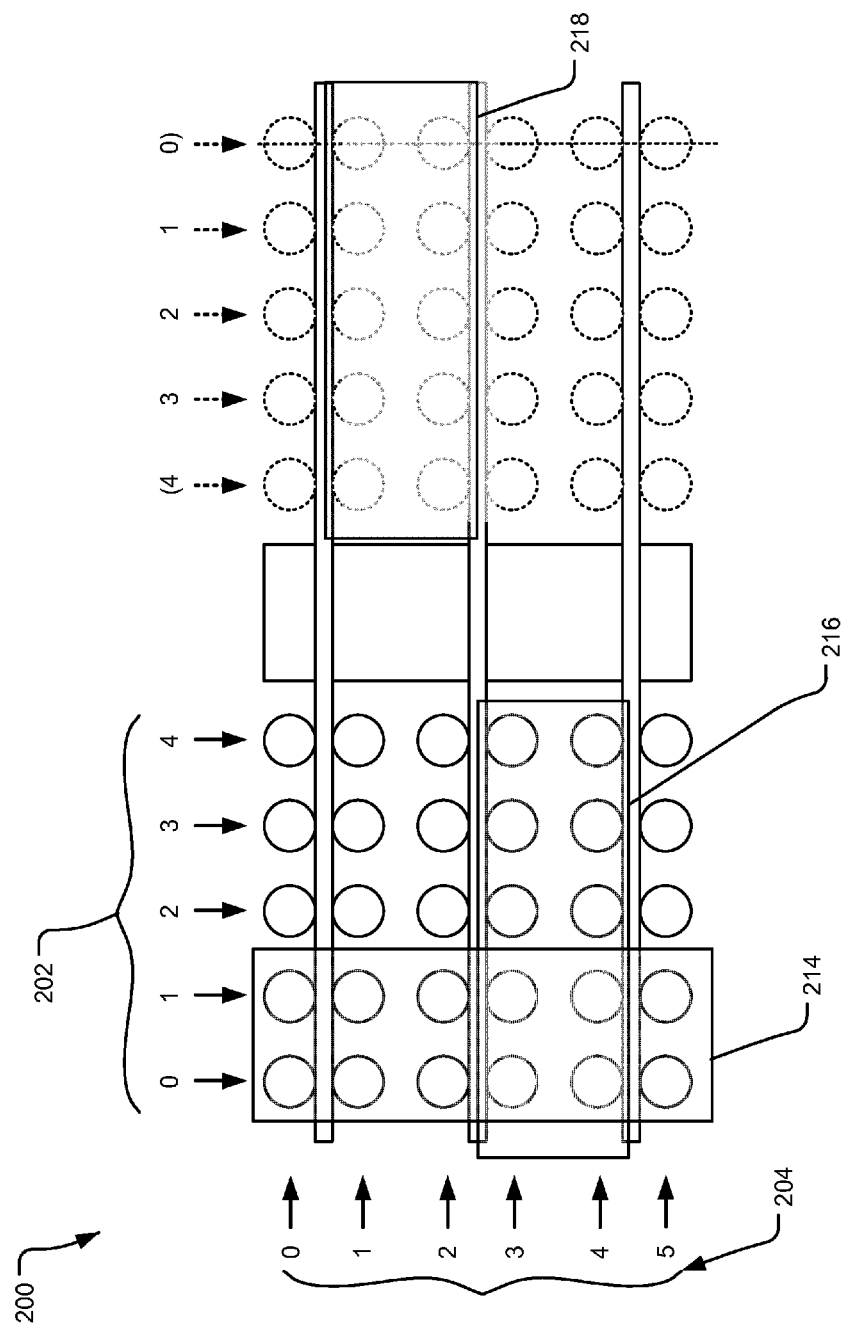
FIG. 2 illustrates an example disc drive with different cylinders and tracks using the tiered data storage system disclosed herein.

FIG. 2 illustrates an example disc drive assembly 200 with a media that is divided into different data zones. The disc drive assembly 200 includes a number of cylinders 202 and a number of heads 204. Specifically, the media 208 is divided into a number of media zones including at least three different zones zone A 214, zone B 216, and zone C 218 that are illustrated in FIG. 2. In one implementation, a zone may be defined a range of cylinders and heads inside of which all tracks are accessed at the same recording frequency. For example, the zone A 214 includes tracks from each of the heads 0-5 and cylinders 0-1.

In an implementation disclosed herein, the tracks in zone A 214 may be configured to have a particular characteristic that is different from other tracks outside zone A. For example, the tracks in zone A 214 may be configured to have a higher data rate due to, for example, the multi-level recording technology with multiple headers. Furthermore, the disc drive assembly 200 may be configured to map LBAs having a specific characteristic to the tracks of zone A 214. Thus, if the tracks in zone A 214 have higher data access rates than a beginning range of LBAs starting from 0 may be mapped to the tracks in the zone A 214.

Similarly, in an alternative implementation, the tracks of zone B 216 may be characterized by a value of a parameter that is different from the value of that parameter for the tracks that are not in zone B 216. As an example, for a number of reasons, it may take higher power to write data to the tracks of zone B 216 compared to the other tracks that are not in zone B 216. In such a case, the disc drive assembly 200 may be configured such that LBAs that are towards the end of the LBA range are mapped to the tracks of zone B 216.

Figure 3:
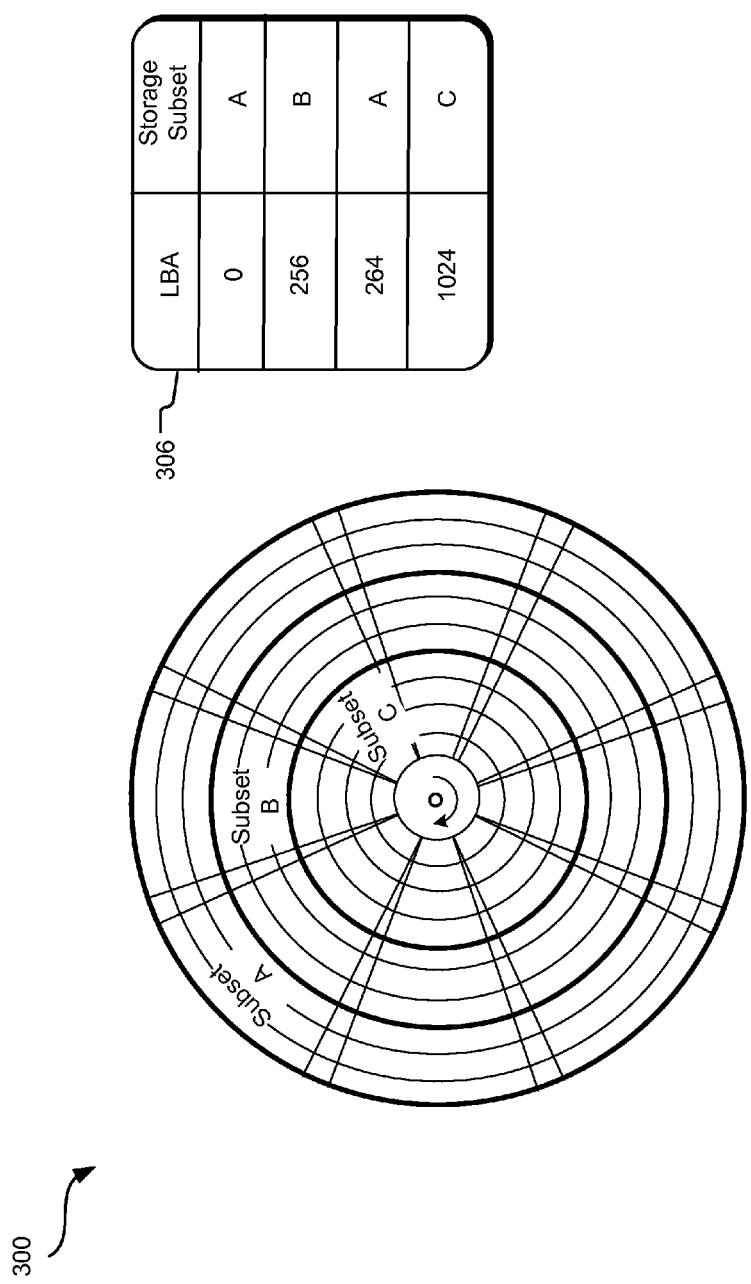
FIG. 3 illustrates an example disc drive with different zones using the tiered data storage system disclosed herein.

FIG. 3 illustrates an example disc drive 300 with different zones using the tiered data storage system disclosed herein. For the example disc drive 300, the media space is logically divided into three storage subsets named subset A, subset B, and subset C. Each of the storage subsets A, B, and C have at least one characteristic with a different value compared to the other subset. For example, each of the storage subsets A, B, and C may have different data density. Alternatively, the data access speed for each of the three subsets may be different. Alternatively, the reliability of storage at each one of the storage subsets A, B, and C may also be different.

In an implementation disclosed herein, different LBAs of the LBA space are mapped to different storage subsets based on a characteristic of the storage subsets, a characteristic of the data mapped to the given LBA space, and a combination thereof. For example, if data mapped to LBA 0 is important data and the reliability of the storage subset A is higher, the implementation disclosed herein may map the LBA 0 to the storage subset A. On the other hand, if the data mapped to LBA 1024 is less important and the reliability of the storage subset C is lower, the implementation disclosed herein may map the LBA 1024 to the storage subset C. The mapping of the LBA space to the storage subsets may be stored in a mapping table 306 as illustrated in FIG. 3.

Figure 4:
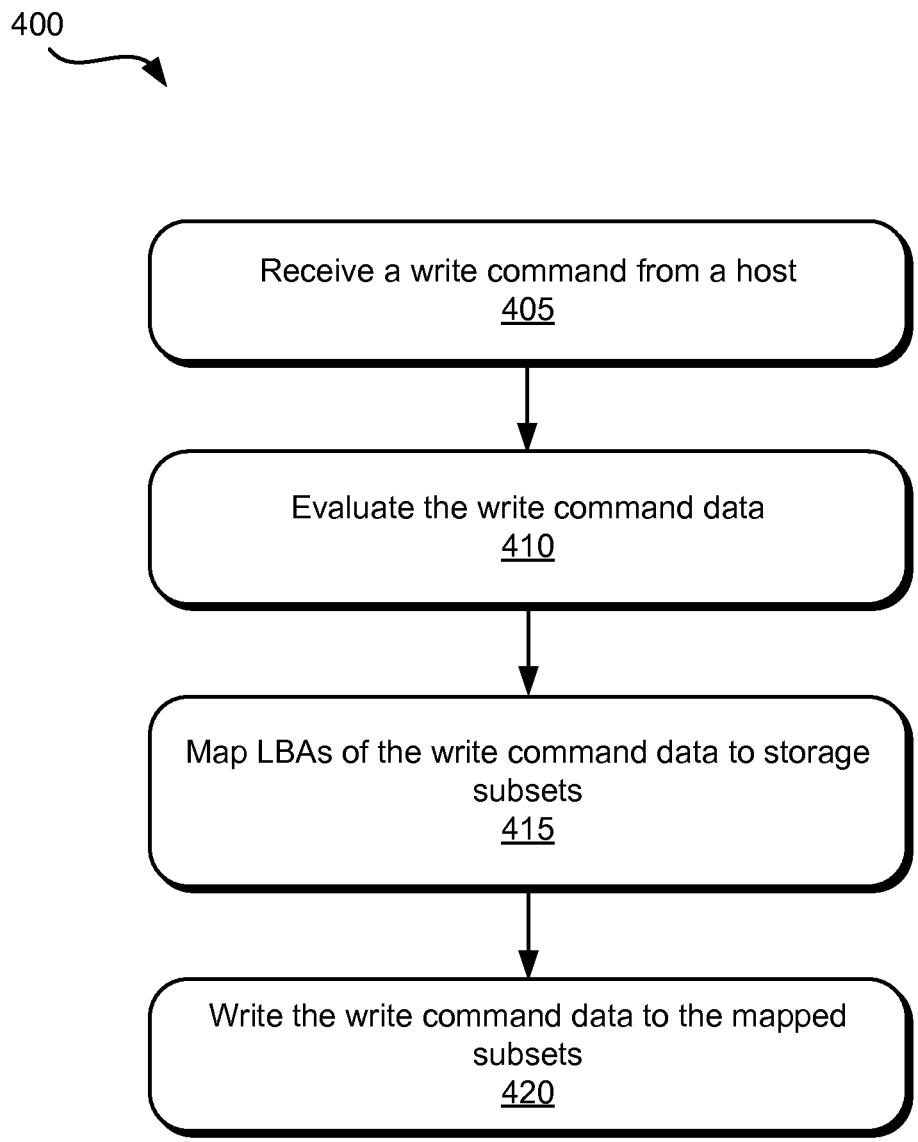
FIG. 4 illustrates an example flowchart including operations of the tiered data storage system disclosed herein.

FIG. 4 illustrates an example flowchart 400 including operations of the tiered data storage system disclosed herein. An operation 405 receives a write command from a host. For example, such a write command may specify writing a specified range of LBAs to a storage media. An operation 410 evaluates the write command data. Such evaluation of the write command data may include, for example, evaluating the read heat of the write command data, evaluating the write heat of the write command data, evaluating the location of the LBAs of the write command data within LBA range, determining the type of the write command data, etc. For example, the operation 410 may evaluate the write command data to determine that the type of the write command data is video data with higher redundancy and therefore such data can sustain higher loss. Yet alternatively, another characteristic of the write data may be the transfer length of the write data. The operation 410 may also evaluate one or more host supplied attributes of the write data.

An operation 415 maps the LBAs of the write command data to storage subsets within a storage media. As an example, LBA may be mapped to a storage subset of the media and further to a particular track or a combination of tracks within a given storage subset. The operation 415 maps the LBA to the storage subsets based on one or more characteristics of the write command data, as evaluated at operation 410, and one or more characteristics of various storage subsets within the media space. In one implementation, the operation 415 maps the LBA to the storage subset using a combination of characteristics evaluated at operation 410. Such characteristics of the storage subsets may be stored in a mapping table or other space within a storage device. Subsequently, an operation 420 writes the write command data to the selected storage subset.

Figure 5:
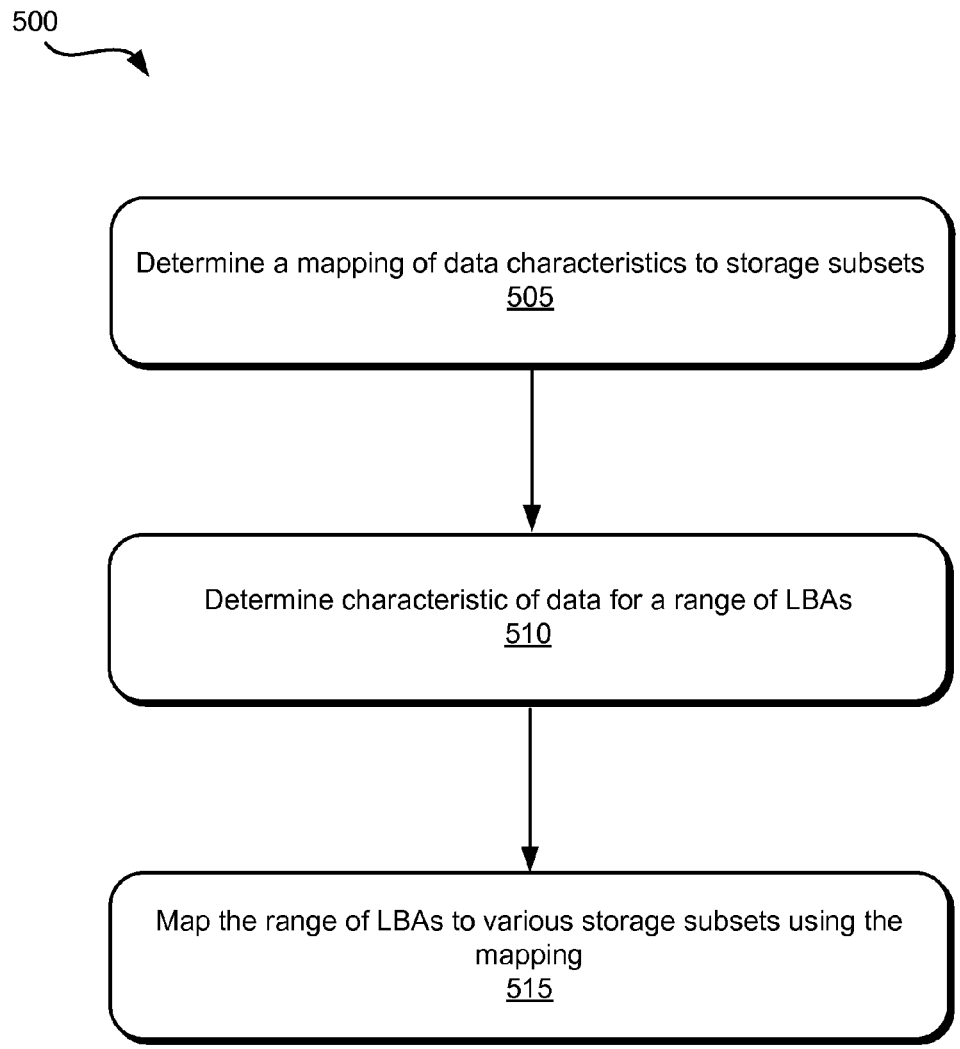
FIG. 5 illustrates an alternate example flowchart including operations of the tiered data storage system disclosed herein.

FIG. 5 illustrates an alternate example flowchart 500 including operations of the tiered data storage system disclosed herein. An operation 505 determines a mapping of data characteristics to storage subsets. For example, the operation 505 may map system data with a storage subset that stores data with higher reliability and map video data with storage subset with low reliability.

An operation 510 determines characteristic of data for the range of LBAs. For example, the operation 510 may determine that a range of LBAs is related to data that is highly important system data and as such should be stored in a storage subset that stores data with high reliability. As another example, the operation 510 may determine that the specified range of LBAs includes data that is not likely to be accessed for a long period of time. An operation 515 maps a range of LBAs using the mapping of data characteristics to storage subsets determined at operation 505. In this case, the operation 505 maps a range of LBAs to a given storage subset.

Figure 6:
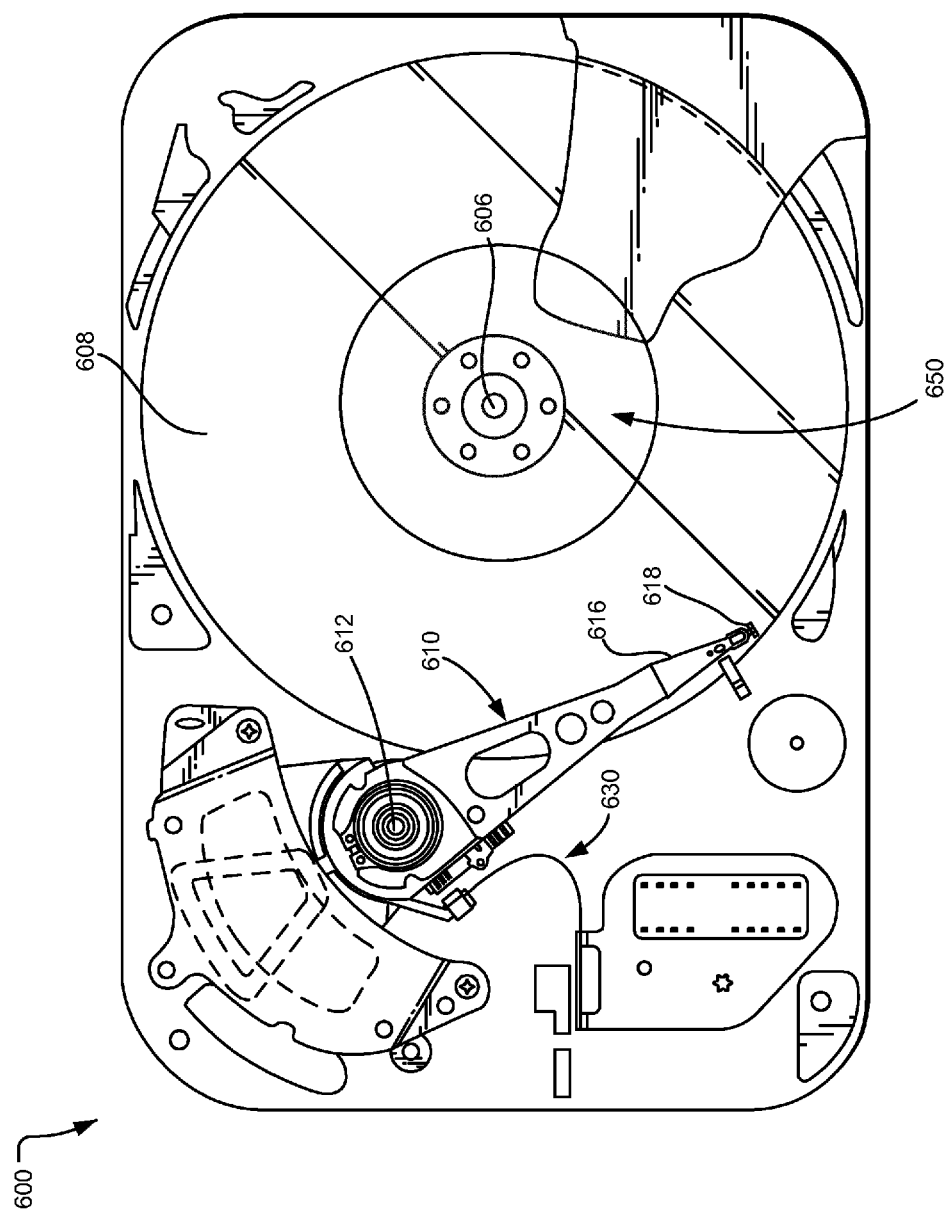
FIG. 6 illustrates a plan view of an example disc drive that includes the tiered data storage system disclosed herein.

FIG. 6 illustrates a plan view of an example disc drive 600. The components include a spindle motor 606 that rotates one or more storage medium discs 608 at a constant high speed. Information is written to and read from tracks on the discs 608 through the use of an actuator assembly 610, which rotates during a seek operation about a bearing shaft assembly 612 positioned adjacent the discs 608. Mounted at the distal end of each of the flexures 616 is a head 618 that includes an air bearing slider enabling the head 618 to fly in close proximity above the corresponding surface of the associated disc 608.

In an implementation of the disc drive 600, the head 618 may be configured to have multiple readers and each of the readers may be configured to read data simultaneously in a first storage subset of the disc 608. For example, a storage subset close to an outer diameter of the disc 608 may store data that can be read using each of the multiple readers, whereas a second storage subset near the inner diameter of the disc 608 may not store data that can be read using each of the multiple readers. In such an implementation of the disc drive 600, it may be useful to store data that needs higher reliability to be stored in the storage subset near inner diameter.

In one implementation of the disc drive 600 the storage space on the storage medium may be divided into one or more storage subsets such that at least one characteristic of these subsets is different. For example, a storage subset 650 of the storage media may have lower power consumption for data storage compared to other storage subsets of the storage media. A controller of the disc drive 600 may map LBAs to one or more storage subsets of the disc drive 600, including the storage subset 650 based on the characteristic data associated with the LBAs and the characteristics of the various storage subsets in a manner disclosed herein.

The above specification and examples provide a complete description of the structures of exemplary implementations of apparatus that may be used for a tiered data storage system. Although various implementations of the apparatus have been described above with a certain degree of particularity, or with reference to one or more individual implementations, those skilled in the art could make numerous alterations to the disclosed implementations without departing from the spirit or scope of the presently disclosed technology. It is intended that all matter contained in the above description and shown in the accompanying drawings shall be interpreted as illustrative only of particular implementations and not limiting. The implementations described above and other implementations are within the scope of the following claims.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A storage device, comprising:
a non-transitory storage media comprising:
a first storage subset of the storage media configured for a first data read/write access method selected from the group consisting of multi-level recording with a single reader, multi-track recording with multiple readers, and a combination of multi-level and multi-track recording with multiple readers having multiple levels under each reader; and
a second storage subset of the storage media using single track or binary level recording technology; and
a storage controller configured to map a range of logical block addresses (LBAs) to one of the first storage subset or the second storage subset using a predetermined criterion based on the first data read/write access method and the second data read/write access.

2. The storage device of claim 1, wherein the first storage subset is configured to store data using multi-level recording technology.

3. The storage device of claim 1, wherein the first storage subset is configured to store data using multi-track recording technology and the first storage subset is allocated to a disc-based media cache.

4. The storage device of claim 1, wherein the first storage subset is allocated to LBAs mapped to external objects with high availability requirements.

5. The storage device of claim 1, wherein the storage controller is further configured to report availability of one or more data sectors of the first storage subset to an external device.

6. The storage device of claim 1, wherein the first storage subset comprises a plurality of data sectors located physically contiguously on the storage media and the first storage subset is mapped to a plurality of contiguous LBAs.

7. The storage device of claim 1, wherein the storage controller is further configured to associate the first storage subset with data having higher heat compared to the data associated with the second storage subset.

8. The storage device of claim 7, wherein the storage controller is further configured to associate the first storage subset with data having higher write heat compared to the data associated with the second storage subset.

9. The storage device of claim 7, wherein the storage controller is further configured to associate the first storage subset with data having higher read heat compared to the data associated with the second storage subset.

10. A storage device, comprising:
a non-transitory storage media comprising:
a first storage subset with a first value of a storage media characteristic and a second storage subset with a second value of the storage media characteristic, the first value of the storage media characteristic being substantially different than the second value of the storage media characteristic, the storage media characteristic being one of total cost of ownership (TCO), power usage per unit storage, and storage reliability; and
a storage controller configured to allocate a plurality of logical block addresses (LBAs) to the storage media between the first storage subset and the second storage subset based on a predetermined criterion in view of the first value of the storage media characteristic and the second value of the storage media characteristic, the first storage subset using multi-level or multi-track recording technology and the second storage subset using single track or binary level recording technology.

11. The storage device of claim 10, wherein the first storage subset is allocated to LBAs mapped to external objects with a first level of availability requirement and the second storage subset is allocated to LBAs mapped to external objects with a second level of availability requirement, the first level of availability requirement being substantially higher than the second level of availability requirement.

12. The storage device of claim 10, wherein the first storage subset is located contiguously on the storage media.

13. The storage device of claim 10, wherein the storage controller is further configured to allocate the plurality of LBAs based on a plurality of characteristics of the data mapped to the one or more of the plurality of the LBAs.

14. A method, comprising:
selecting a range of logical block addresses (LBAs) from one of a plurality of data storage subsets on a non-transitory data storage media; and
remapping the range of selected LBAs to another of the plurality of data storage subsets on the non-transitory data storage media based on a predetermined criterion using a value of a storage media characteristic of the plurality of data storage subsets, the value of the storage media characteristics being at least one of storage capacity, storage density, and total cost of ownership (TCO), wherein the one of the plurality of data storage subsets is configured to store or read data using single reader media recording and the another of the plurality of data storage subsets is configured to store or read data using two-dimensional magnetic recording (TDMR).

15. The data storage system of claim 14, wherein the one of the plurality of data storage subsets is configured to store or read data using multi-level recording with single reader.

16. The data storage system of claim 14, wherein the one of the plurality of data storage subsets or the another of the plurality of data storage subsets is configured to store or read data using shingled media recording (SMR).

17. The data storage system of claim 14, wherein the another of the plurality of data storage subsets uses parallel readers or writers on multiple heads wherein selecting a range of LBAs further comprises selecting a range of LBAs with data that requires reduced latency and wherein remapping the range of selected LBAs further comprises remapping the range of selected LBAs to the another data storage subset using parallel readers or writers on multiple heads.

* * * * *